United States Patent [19]

Lazar

[11] Patent Number: 4,726,773

[45] Date of Patent: Feb. 23, 1988

[54] DEVICE FOR DEPICTING CONSTELLATIONS ON A CEILING

[76] Inventor: Jay L. Lazar, 35 Dartford Rd., Bethlehem, Pa. 18015

[21] Appl. No.: 866,729

[22] Filed: May 27, 1986

[51] Int. Cl.⁴ ............................................. G09B 27/04
[52] U.S. Cl. .................................... 434/289; 434/285; 40/583
[58] Field of Search .................... 434/145–148, 434/285–287, 289, 365, 430, 433; 40/427, 542, 544, 582, 583

[56] References Cited

U.S. PATENT DOCUMENTS

| | | | |
|---|---|---|---|
| 833,433 | 10/1906 | Wyman | 434/289 |
| 2,554,408 | 5/1951 | Hile | 40/620 |
| 2,866,704 | 12/1958 | Korkosz | 434/289 |
| 3,037,300 | 6/1962 | Grosser | 434/147 |
| 3,251,143 | 5/1966 | Eisenhauer | 434/285 |
| 3,934,366 | 1/1976 | Reiser | 40/582 |
| 4,271,604 | 6/1981 | Rowsey, Jr. | 434/289 |
| 4,568,287 | 2/1986 | Wederski | 434/285 |

FOREIGN PATENT DOCUMENTS 2421431 11/1979 France ............................ 434/289

Primary Examiner—John E. Murtaugh
Assistant Examiner—Andrew Joseph Rudy
Attorney, Agent, or Firm—John J. Selko

[57] ABSTRACT

Constellations are depicted on a ceiling with phosphorescent indicators of a predetermined planar surface area, which indicators are proportionally related to each other by a constant multiplication factor, to depict various star brightness magnitudes. A template has apertures with predetermined shapes, such that each aperture permits the affixing therein of only one indicator of a specific surface area against a ceiling. When all apertures are filled with indicators, the template is removed leaving a depiction of the constellations on the ceiling.

9 Claims, 2 Drawing Figures

| CORRELATION | |
|---|---|
| SHAPE OF APERTURES | SHAPE OF INDICATORS |
| △ | △ |
| ☐ | ✦ |
| ⬠ | ★ |
| ⬡ | ✦ |
| ✦ | ✦ |
| ◯ | ✦ |

DEVICE FOR DEPICTING CONSTELLATIONS ON A CEILING

BACKGROUND OF THE INVENTION

This invention relates to the graphic representation of the constellations upon a surface such as an overhead ceiling of a darkened bedroom. As is well known, the sky, as viewed at night by the unaided human eye, resembles an inverted half-spherical surface on which appears stars of various magnitudes of brightness, which stars are recognized as groups called constellations. Such overhead sky is referred to herein as the celestial sphere. It is also well known to depict the celestial sphere and the constellations on a flat surface.

As is well known, the apparent magnitude of brightness of stars capable of being seen at night by the unaided human eye varies. As used herein, the term "unaided human eye" means normal eyesight without the benefit of magnifying optical devices, other than corrective eyeglass lenses. Astronomers classify the magnitude of brightness of stars in constellations on a cardinal number scale of zero (0) to five (5), with zero being the brightest star and five the least bright star visible to the unaided human eye. There are a very few stars brighter than a zero brightness star, and such stars would have a number less than zero, i.e. a negative number. For purposes of this invention such stars are considered to be zero brightness stars. Between each numerical magnitude ranking on this scale, the brightness of stars is multiplied by a factor of two and one-half (2.5). For example, a star of magnitude 1 is 2.5 times as bright as a star of magnitude 2. A star of magnitude 2 is 2.5 times as bright as a star of magnitude 3 and so on.

Each constellation is comprised of a plurality of stars of various magnitudes of brightness. Table I lists the names of various constellations visible in the Northern Hemisphere, and the number of stars of each magnitude therein.

TABLE I

| NAME | \multicolumn{6}{c}{MAGNITUDE OF BRIGHTNESS} |
|---|---|---|---|---|---|---|
| | 0 | 1 | 2 | 3 | 4 | 5 |
| Hydra | — | — | 1 | 6 | 9 | — |
| Crater | — | — | — | — | 3 | 5 |
| Corvus | — | — | — | 4 | 2 | — |
| Vela | — | — | 2 | 1 | 4 | — |
| Virgo | — | 1 | — | 3 | 8 | — |
| Libra | — | — | — | 3 | 1 | — |
| Bootes | 1 | — | — | 4 | 3 | — |
| Serpens | — | — | — | 6 | 12 | 2 |
| Ophiuchus | — | — | 1 | 3 | 3 | — |
| Hercules | — | — | — | 6 | 11 | 3 |
| Leo | — | 1 | 2 | 3 | 4 | — |
| Ursa Major | — | — | 6 | 7 | 5 | 1 |
| Cancer | — | — | — | — | 4 | 1 |
| Canis Minor | 1 | — | — | 1 | — | — |
| Gemini | — | 1 | 2 | 5 | 1 | — |
| Puppis | — | — | 1 | 6 | 2 | — |
| Canis Major | 1 | — | 4 | 3 | 2 | 2 |
| Orion | 1 | 1 | 5 | 3 | 9 | 5 |
| Lepus | — | — | — | 4 | 4 | 1 |
| Aquila | — | 1 | — | 5 | 4 | 2 |
| Sagittarius | — | — | 2 | 8 | 3 | — |
| Capricornus | — | — | — | 2 | 7 | 7 |
| Aquarius | — | — | — | 2 | 13 | 10 |
| Piscis Austrinus | — | 1 | — | — | 3 | 5 |
| Grus | — | — | 2 | 3 | 1 | — |
| Pisces | — | — | — | — | 8 | 13 |
| Pegasus | — | — | 3 | 3 | 8 | — |
| Andromeda | — | — | 2 | 1 | 7 | — |
| Aries | — | — | 1 | 1 | 1 | 1 |
| Cetus | — | — | 2 | 1 | 9 | 2 |

TABLE I-continued

| NAME | \multicolumn{6}{c}{MAGNITUDE OF BRIGHTNESS} |
|---|---|---|---|---|---|---|
| | 0 | 1 | 2 | 3 | 4 | 5 |
| Scorpius | — | 1 | 4 | 11 | — | — |
| Corona Borealis | — | — | 1 | — | 4 | 2 |
| Lyra | 1 | — | — | 2 | 2 | 3 |
| Cygnus | — | 1 | 1 | 4 | 1 | 1 |
| Draco | — | — | 1 | 5 | 9 | 3 |
| Ursa Minor | — | — | 2 | 1 | 3 | 1 |
| Cepheus | — | — | — | 3 | 2 | — |
| Cassiopeia | — | — | 3 | 2 | 1 | — |
| Perseus | — | — | 2 | 5 | 7 | 1 |
| Auriga | 1 | — | 2 | 4 | 2 | — |
| Taurus | — | 1 | — | 3 | 7 | — |

It is well known to depict the stars forming a constellation on the surface of a ceiling of a darkened room by affixing thereto materials that glow in the dark. Such materials are referred to herein as phosphorescent indicators, and are defined as materials that exhibit luminescence caused by the absorption of radiations, which luminescence continues for a noticeable time after the radiations have stopped.

Such phosphorescent indicators for depicting stars can be formed from materials which are available under the trademark "SPOT-LITE GLO FILM" from Conrad-Hanovia, Inc., and under the trademark "SAFE-GLO" from Coburn Corporation. Other commercially available phosphorescent materials will work in this invention if they have luminescent qualities similar to the above-cited materials.

Problems with prior art devices for depicting the constellations on a surface are (i) the lack of realism due to the lack of proper proportionality between the brightness of the individual stars depicted by the phosphorescent indicators, and (ii) lack of ease in locating the phosphorescent indicators with respect to each other so as to accurately depict the celestial sphere on a flat surface.

SUMMARY OF THE INVENTION

I have discovered that, with the invention described herein, it is possible to depict the constellations on a ceiling with great realism by correlating the predetermined surface area of a phosphorescent indicator to the magnitude of brightness of the star it depicts. The phosphorescent indicators are located in proper position to each other with a template having various sized apertures therein, one aperture for each star to be depicted. Each aperture is of a predetermined size and shape, so as to define the location of one and only one size of indicator having a predetermined planar surface area. A plurality of constellations are represented by apertures in the template. The template is removably contacted against the surface to be viewed. After the indicators are positioned within the apertures, the template is removed, leaving the indicators depicting the constellations in the night sky. The stars depicted are properly located with respect to each other, and the individual star brightness is properly proportioned to the brightness of the other stars, all of which greatly enhances realism.

DESCRIPTION OF PREFERRED EMBODIMENT AND BEST MODE

Figures 1, 2:
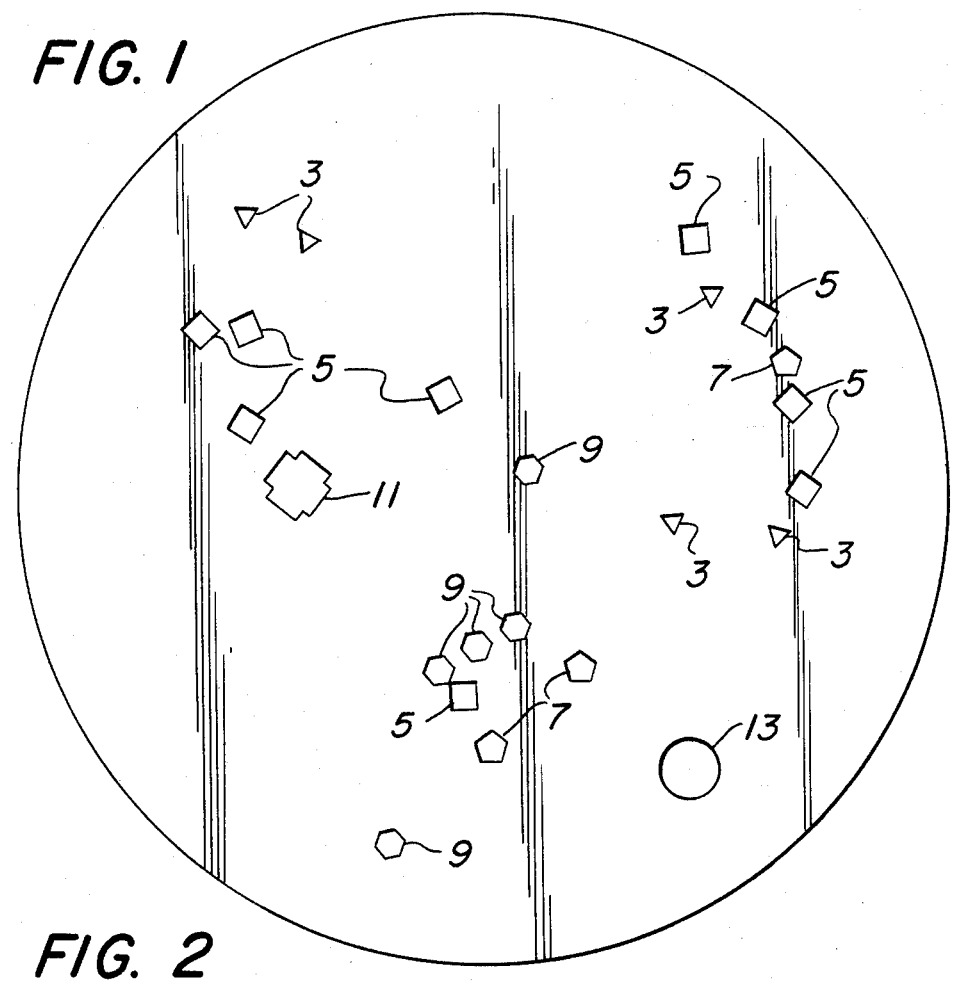
FIG. 1 shows a planar view of a portion of the template, showing apertures for the constellation Orion, with other constellations on the template not shown.
FIG. 2 shows a correlation between the shape of the indicators and apertures shown in FIG. 1, with the indicators shown in dotted lines within the apertures.

Referring to FIG. 1, a substantially flat template, or stencil, is shown depicting the celestial sphere. Such template is fastened in contact with a surface such as a bedroom ceiling by conventional means (not shown) such as thumb tacks or two sided tape. The template is made of flexible material such as paper.

I prefer to make the template circular, with a diameter of six feet. Larger template sizes cannot be properly manipulated by one person and smaller template sizes lose realism. Also, a template of six feet fits nicely in conventional bedrooms, between the wall and the central ceiling lighting fixture found therein. As described herein, the normal viewing distance of the display would be approximately 4 to 6 feet, the distance range beneath a conventional ceiling for a normal-sized person sitting or reclining on a bed.

The template can be drawn from prior art drawings of the celestial sphere and scaled up to size with a pantograph, as is well known.

A plurality of constellations is represented by the template with apertures therein, as described hereinafter. FIG. 1 shows only the constellation Orion for purposes of description. It should be understood that the principles of the invention are applicable to all other constellations.

As shown in Table I, Orion includes at least one star of each of the six magnitudes of brightness from 0 to 5. I have determined through trial and error that at the normal viewing distance, the unaided human eye can reliably detect a polygonal phosphorescent indicator having a planar surface area of approximately 0.00856 square inches. I have also discovered that the unaided human eye can detect to about the same degree in the night sky a star of magnitude 5. Accordingly, the surface area of approximately 0.00856 square inches of an indicator is predetermined to represent only magnitude 5 stars in Orion. Apertures 3 are made with a predetermined shape, so as to indicate the location of only one specific indicator group from the six groups of indicators used in this invention, i.e. an indicator having approximately 0.00856 square inches. I prefer the shape of aperture 3 to be a triangle. Apertures 5 are shaped as a square to indicate only magnitude 4 stars. Magnitude 3, 2, 1 and 0 stars are represented by apertures 7, 9, 11 and 13, respectively which apertures are respectively shaped as pentagon, hexagon, cruciform and circle.

As shown in FIG. 2, the indicators are shaped as follows for magnitude 5, 4, 3, 2, 1 and 0 stars; triangle, four-pointed star, five-pointed star, six-pointed star, eight-pointed star and twelve-pointed star. Through trial and error, I have determined that indicators having a plurality of points or prongs present the best shapes to handle while looking upwardly for the attaching of indicators into the apertures.

I have also discovered that the combination of aperture shapes and indicator shapes shown in FIG. 2 and Table II provides greatly enhanced ease and reliability of mounting. It would be equivalent to make the shape of the aperture and its corresponding indicator the same, including planar circles, but doing so significantly increases the difficulty in properly fitting the indicators into the apertures with the template overhead because the planar areas are so small on the indicators being handled.

TABLE II

| APERTURE SHAPE | INDICATOR SHAPE | INDICATOR AREA in sq. in. | STAR MAGNITUDE |
| --- | --- | --- | --- |
| Triangle | Triangle | 0.00856 | 5 |
| Square | Four-Pointed Star | 0.01713 | 4 |
| Pentagon | Five-Pointed Star | 0.03425 | 3 |
| Hexagon | Six-Pointed Star | 0.06850 | 2 |
| Cruciform | Eight-Pointed Star | 0.13701 | 1 |
| Circle | Twelve-Pointed Star | 0.27401 | 0 |

As described in Table II the magnitude 5 star indicator has the critical minimum planar surface area of 0.00856 square inches. In keeping with the multiplication factor for star magnitudes, i.e., 2.5, the planar surface area of the next larger indicator should be 2.5 times that of the magnitude 5 star and so on through magnitude 0 stars.

However, I have also discovered that with a constant multiplication factor of 2.5, the various apertures in the template for some constellations begin to overlap substantially, making identification of proper apertures significantly more difficult. I have determined through trial and error that a constant multiplication factor approximately equal to 2.0 works without sacrificing realism. A factor less than 2.0 makes the display unworkable due to lack of realism. A factor more than 2.5 causes unacceptable interference between and among apertures. Accordingly, the critical range between 2.0 and 2.5 for a constant multiplication factor provides the unexpected combination of realism of display and ease of mounting of indicators. Thus, the surface area of any one indicator is greater than the surface area of the next smaller indicator by a constant multiplication factor.

I claim:

1. A device for depicting constellations in a night sky on a substantially flat surface at a given viewing distance, comprising in combination:

(a) a plurality of phosphorescent polygonal indicators for individual attachment to said surface, representing a plurality of individual stars having brightness magnitudes in the range of 0 through 5;

(b) each said indicator having a planar surface area of predetermined value, and all said indicators comprising a series of indicator groups, with each indicator group consisting of indicators having equal surface areas, said equal surface areas being different from the surface areas of the remaining indicators, said surface areas satisfying the following conditions:

(i) the surface area of any one indicator is greater by a constant multiplication factor than the surface area of an adjacent smaller indicator in the series;

(ii) the surface area of the smallest indicator being predetermined to be approximately equal to the surface area of an indicator which an unaided human eye can reliably detect at said given viewing distance; and (iii) said smallest indicator being preselected to represent a brightness magnitude 5 star; and (c) a flexible template for removably attaching in contact with said surface, said template having therein a plurality of apertures positioned with respect to each other similar to the stars and constellations in the night sky; said apertures having a plurality of predetermined shapes such that each aperture indicates the location for attachment therein of only one specific indicator planar surface; whereby, after said apertures are filled with said indicators, said template can be removed leaving said indicators to depict the constellations in the night sky.

2. The invention of claim 1 wherein said constant multiplication factor is between 2.0 and up to but not including 2.5.

3. The invention of claim 1 wherein the surface area of said smallest indicator is approximately 0.00856 square inches.

4. The Invention of claim 3 wherein the viewing distance is approximately 4 to 6 feet.

5. The invention of claim 4 wherein stars of magnitudes 5, 4, 3, 2, 1, and 0 are represented by indicators of approximate planar areas 0.00856, 0.01713, 0.03425, 0.06850, 0.13701, and 0.27401, square inches, respectively.

6. The invention of claim 4 wherein stars of magnitudes 5, 4, 3, 2, 1, and 0 are represented by apertures having respective shapes of triangle, square, pentagon, hexagon, cruciform, and circle.

7. The invention of claim 4 wherein stars of magnitudes 5, 4, 3, 2, 1, and 0 are represented by indicators having the preselected respective polygonal shapes of triangle, four-pointed star, five-pointed star, six-pointed star, eight-pointed star, and twelve-pointed star.

8. The invention of claim 7 wherein the apertures have the same shapes as the indicators.

9. The invention of claim 4 wherein the apertures and indicators are planar circles.

* * * * *